United States Patent [19]

Ferrary

[11] 4,314,964
[45] Feb. 9, 1982

[54] METHOD FOR THE MANUFACTURE OF A CYCLE OR AUTO-CYCLE WHEEL RIM

[76] Inventor: Jean-Paul Ferrary, 5, Rue Le Châtelier, 75017 Paris, France

[21] Appl. No.: 163,774

[22] Filed: Jun. 27, 1980

[30] Foreign Application Priority Data

Jul. 2, 1979 [FR] France .................. 79 17137

[51] Int. Cl.³ .................. B29D 3/02; B60B 5/02
[52] U.S. Cl. .................. 264/501; 264/513; 264/516; 264/315; 301/63 PW; 301/98
[58] Field of Search ............ 264/501, 512, 513, 516, 264/315; 301/63 PW, 97, 98

[56] References Cited

U.S. PATENT DOCUMENTS

| 2,289,990 | 7/1942 | Parker | 264/315 X |
| 3,629,030 | 12/1971 | Ash | 264/512 X |
| 4,030,754 | 6/1977 | Merlette | 301/98 |

FOREIGN PATENT DOCUMENTS

| 780966 | 8/1957 | United Kingdom | 301/97 |
| 1165343 | 9/1969 | United Kingdom | 264/516 |

*Primary Examiner*—Jan H. Silbaugh
*Attorney, Agent, or Firm*—Wenderoth, Lind & Ponack

[57] ABSTRACT

A method for manufacturing a cycle or auto-cycle wheel rim includes employing a tubular braided fibre glass sleeve which is inflated internally so as to conform its shape to the inside of a mould. An inflatable sleeve is placed inside the braided glass fibre sleeve. An appropriate length of the assembly formed by the two concentric sleeves is placed in a mould which has the shape of the wheel rim to be formed and which has plastics material injection channels and at least one air inlet channel emerging inside the inflatable sleeve. The inflatable sleeve is inflated through the air inlet channel. Plastics material in injected into the mould between the inflated sleeve and the braided fibre glass sleeve. The mold is baked for setting the structure obtained, and the wheel rim thus is then stripped from the mould.

5 Claims, 6 Drawing Figures

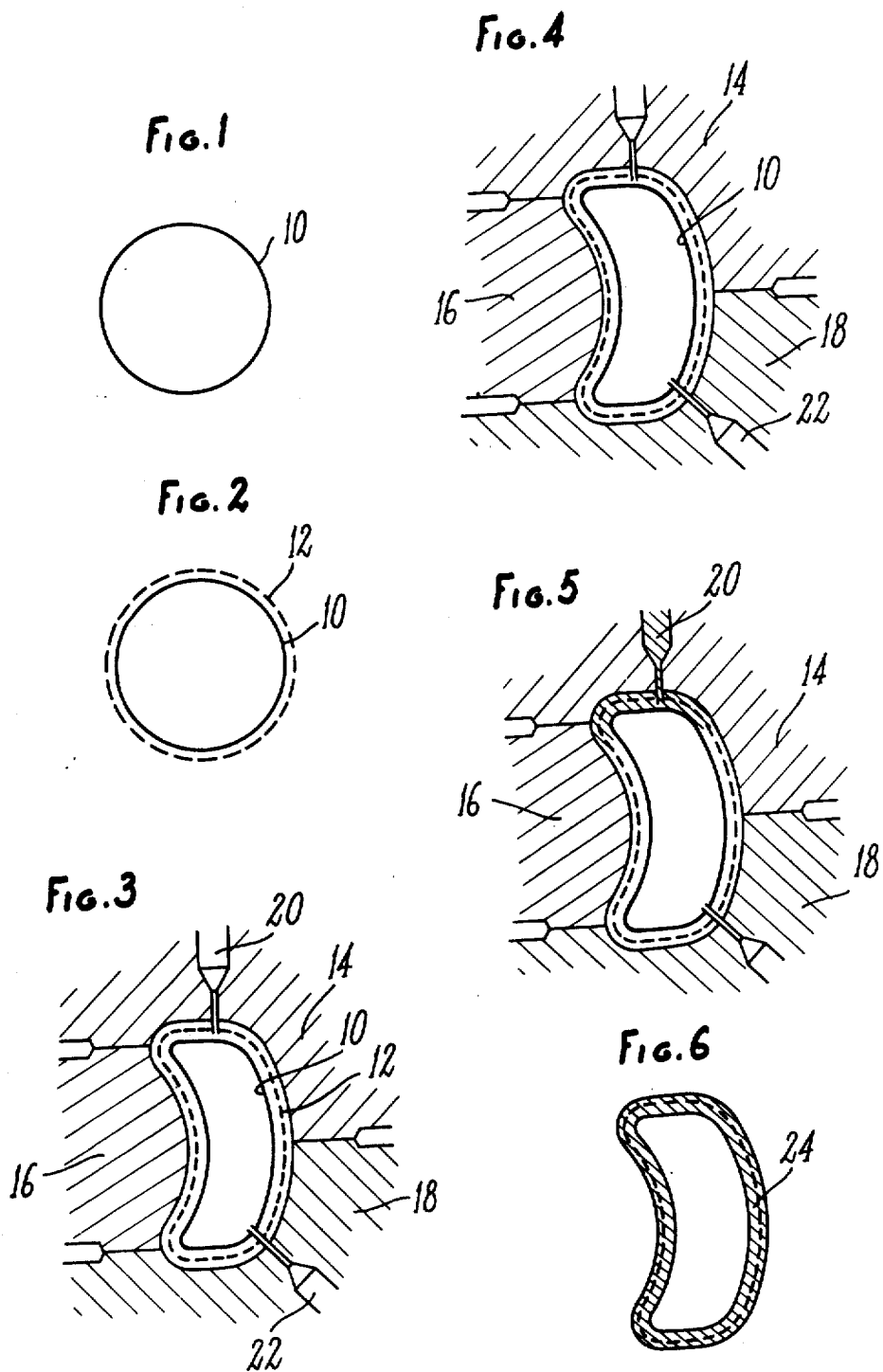

4,314,964

METHOD FOR THE MANUFACTURE OF A CYCLE OR AUTO-CYCLE WHEEL RIM

BACKGROUND OF THE INVENTION

The present invention relates to a method for making a wheel rim, particularly for cycles or auto-cycles.

It is known that such wheel rims are currently made either in steel or in a light alloy. The steel rims are economical to manufacture, but they have the disadvantage of being heavy. On the other hand, the light alloy rims have, of course, the advantage of light weight relative to the steel rims, but their manufacture remains costly.

SUMMARY OF THE INVENTION

The object of the present invention is to provide a manufacturing method of a wheel rim in a reinforced synthetic material, designed so as to exhibit improved mechanical characteristics relative to steel rims or light alloy rims, such method moreover having the advantage of being economical in its application and allowing, on the other hand, mass production.

The method according to the invention consists in applying to the manufacture of wheel rims the known process of inflatable molding, but adapted to include a tubular braided glass fibre sleeve which also is inflated internally for conforming its shape to the inside of a mould and which forms reinforcement for the wheel rim.

This method is characterized in that it comprises the successive following steps:

a—placing a inflatable sleeve inside the braided glass fibre sleeve;

b—placing an appropriate length of the assembly formed by the two concentric sleeves in a mould which has the shape of the wheel rim to be formed and which has plastics material injection channels and at least one air inlet channel emerging inside the inflatable sleeve;

c—inflating the inflatable sleeve through the air inlet channel;

d—injecting plastics material into the mould, between the inflated sleeve and the braided fibre glass sleeve; and, e—baking the mould for setting the structure obtained, and then stripping the wheel rim thus formed.

According to a characteristic of the invention, it is possible to diffuse aluminum powder in the plastics material injected in the mould so as to improve the behaviour during braking of the finished wheel rim, through a better dissipation of the heat produced by braking.

According to a further characteristic of the invention, one incorporates into the plastics material injected into the mould reflectorizing particles such as, in particular, glass microspheres, so as to make the wheel rims manufactured according to the method of the invention retro-reflecting.

BRIEF DESCRIPTION OF THE DRAWINGS

Further characteristics and advantages of the invention will become more apparent from the following description of the successive steps used for practicing the method, reference being made to the accompanying drawings, wherein:

FIG. 1 is a sectional view of the inflatable sleeve;

FIG. 2 is a sectional view of the braided fibre glass sleeve surrounding the inflatable sleeve;

FIG. 3 shows the position in the mould of the assembly represented in FIG. 2;

FIG. 4 shows the inflation step of the sleeve;

FIG. 5 shows the injection step of the plastics material; and,

FIG. 6 is a sectional view of the finished wheel rim.

DETAILED DESCRIPTION OF THE INVENTION

As mentioned hereabove, the method according to the invention uses a tubular sleeve 12 made of braided fibre glass which is inflated for conforming it to the inside shape of a wheel rim mould.

FIG. 1 shows an inflatable tubular sleeve 10, which is introduced (FIG. 2) inside the tubular sleeve 12. During the following step, there is placed an appropriate length of the assembly of the two sleeves 10,12 thus formed into a wheel rim mould (FIG. 3).

According to the invention, the mould is made in three parts, respectively 14, 16 and 18, and comprises, on the one hand, a number of channels 20 for the injection of the plastics material, and at least one channel 22 for feeding air into the inflatable sleeve 10. According to a preferred embodiment of the mould, there are foreseen twelve injection channels for the plastics material, positioned on the mould so as to obtain a homogeneous distribution of the plastics material.

During the step shown in FIG. 4, the sleeve 10 is inflated by blowing compressed air through channel 22. This sleeve 10 remaining in the inflated state, one proceeds then (FIG. 5) to the injection of the plastics material by channels such as 20. Such channels provide a homogeneous distribution of the material which impregnates the braided fibre glass sleeve 12. One proceeds, thereafter, to the baking of the mould for setting the plastics material.

The final step of the method consists in separating the three mould elements in order to strip the wheel rim 24, shown in FIG. 6.

According to the invention, one may incorporate aluminum particles in the plastics material injected in the mould. Such particles improve the behaviour during the braking of the finished wheel rim by providing a good dissipation of the heat resulting from braking.

According to a further characteristic of the invention, one may also incorporate reflectorizing particles in the injected plastics material, for example glass microspheres, which impart to the finished rim retroreflecting properties which reinforce the security of the cycles and auto-cycles equipped with such rims.

The wheel rims made according to the invention may be designed for receiving tubular tires, as in the case of rim 24, shown in FIG. 6, or standard tires with beads.

The method according to the invention may also be used for manufacturing wheel rims such as described in copending application Ser. No. 163,772, filed June. 27, 1980 and Ser. No. 163,773, filed June 27, 1980.

What I claim is:

1. A method of manufacturing a reinforced hollow cycle or auto-cycle wheel rim, said method comprising:

placing a inflatable sleeve coaxially within a braided glass fiber sleeve thereby forming a concentric sleeve assembly;

providing a mould which has a toroidal mold cavity of a shape corresponding to the exterior shape of a wheel rim to be formed, at least one plastic material injection channel extending into said mold cavity, and at least one air inlet channel extending into said mold cavity;

positioning within said mold cavity a length of said concentric sleeve assembly sufficient to extend around said mold cavity; such that said at least one air inlet channel extends inside said inflatable sleeve injecting air through said at least one air inlet channel into the interior of said inflatable sleeve, and thereby inflating said sleeve to form a toroidal hollow chamber within said mold cavity;

injecting plastic material through said at least one plastic material injection channel extending to between the inflated sleeve and said braided glass fiber sleeve, such that said plastic material impregnates said braided glass fiber sleeve and fills between the inflated sleeve and said mold to form a molded plastic body having embedded therein said braided glass fiber sleeve;

heating said mold to thereby set said molded plastic body and form a wheel rim reinforced by said braided glass fiber sleeve; and removing said wheel rim from said mold.

2. A method as claimed in claim 1, wherein said mold includes a plurality of said plastic material injection channels spaced circumferentially around said mold cavity, and said step of injecting said plastic material comprises insuring a homogeneous distribution of said plastic material around the circumference of said mold cavity by injecting said plastic material through said plurality of plastic material injection channels.

3. A method as claimed in claim 1, further comprising increasing the heat dissipation capability of said wheel rim, and thereby the braking performance thereof, by incorporating aluminum particles into said plastic material, such that said aluminum particles are embedded in said wheel rim.

4. A method as claimed in claim 1, further comprising imparting reflecting properties to said wheel rim by incorporating reflectorizing particles into said plastic material, such that said reflectorizing particles are embedded in said wheel rim.

5. A method as claimed in claim 4, wherein said reflectorizing particles comprise glass microspheres.

* * * * *